United States Patent [19]

Ju et al.

[11] Patent Number: 5,978,342

[45] Date of Patent: Nov. 2, 1999

[54] DISK TRAY FOR DISK PLAYER HAVING ECCENTRIC DISK RECEIVING PORTIONS

[75] Inventors: Seoung-sam Ju; Min-jong Lee, both of Suwon, Rep. of Korea

[73] Assignee: Samsung Electronics Co., Ltd., Kyungki-do, Rep. of Korea

[21] Appl. No.: 09/026,608

[22] Filed: Feb. 20, 1998

[30] Foreign Application Priority Data

Mar. 14, 1997 [KR] Rep. of Korea .................. 97-8742

[51] Int. Cl.⁶ .................................................. G11B 33/02
[52] U.S. Cl. .................................... 369/75.2; 369/77.1
[58] Field of Search ........................ 369/75.2, 77.1

[56] References Cited

U.S. PATENT DOCUMENTS

| | | | |
|---|---|---|---|
| 4,773,057 | 9/1988 | Otsuka et al. | 369/75.2 |
| 5,043,963 | 8/1991 | Iwamoto | 369/36 |
| 5,218,592 | 6/1993 | Isshiki et al. | 369/75.2 |
| 5,528,567 | 6/1996 | Kim | 369/37 |
| 5,802,022 | 9/1998 | Kim et al. | 369/37 |

*Primary Examiner*—William J. Klimowicz
*Attorney, Agent, or Firm*—Sughrue, Mion, Zinn, Macpeak & Seas, PLLC

[57] ABSTRACT

A disk tray for a disk player comprising a first disk receiving portion for receiving a first disk and a second disk receiving portion formed on the bottom of the first disk receiving portion for receiving a second disk having a diameter smaller than that of the first disk, so that a center of the second disk receiving portion is eccentric from a center of the first disk receiving portion by a predetermined distance.

3 Claims, 4 Drawing Sheets

DISK TRAY FOR DISK PLAYER HAVING ECCENTRIC DISK RECEIVING PORTIONS

BACKGROUND OF THE INVENTION

1. Field of the Invention

The present invention relates to a disk tray which is inserted into or ejected from a body of a disk player, for loading a disk into the disk player body. In particular, the present invention is directed to a disk tray with an improved structure for aligning a disk after it has been reproduced.

2. Description of the Related Art

In general, as shown in FIG. 1, a disk player includes a disk player body 1 and a disk tray 10 installed movably along an ejection or inserting direction A1 or A2 relative to the disk player body 1. The disk tray 10 includes a first disk receiving portion 11 for receiving a first disk having a 12 cm diameter and a smaller, second disk receiving portion 12 for receiving a second disk having an 8 cm diameter. The second disk receiving portion 12 which has a center coinciding with a center C1 of the first disk receiving portion 11, is formed to be recessed from a bottom 11a of the first disk receiving portion 11. When the disk tray 10 is inserted to the disk player body 1, the first or second disk on the first or second disk receiving portion 11 or 12 is loaded into the disk player body 1.

For example, when the disk tray 10 having the second disk D2 arranged on the disk receiving portion 12 is inserted into the disk player body 1, a deck 2 in the disk player body 1 pivots upward with respect to a hinge 1a, from the position represented with a dashed line to the position represented with a solid line, in order to reproduce/play the second disk D2. Also, when the deck 2 pivots upward, a turntable 4 fixed to a rotation shaft of a spindle motor 3 connected to a free end of the deck rises, to thereby lift the second disk D2 on the disk tray 10, as represented with a solid line. At this time, a center of the turntable 4 coincides with the center C1 of the first and second disk receiving portions 11 and 12. As described above, after the second disk D2 is lifted by the turntable 4, information of the second disk D2 is reproduced/played.

To unload the second disk D2, the reproduction of the second disk D2 is stopped, and the deck 2 pivots downward, thus causing the turntable 4 to move downward. The second disk 10 is received on the second disk receiving portion 12 of the disk tray 10 according to the downward movement of the turntable 4, and then the disk tray 10 is ejected from the disk player body 1.

As the turntable 4 descends to place the second disk D2 on the second disk receiving portion 12 of the disk tray 10, the turntable 4 moves along a circular orbit centering around the hinge 1a by the deck 2 which pivots around the hinge 1a. Accordingly, the second disk D2 which is supported by the turntable 4 also descends along the circular orbit "R" around the hinge 1a as shown in FIG. 3. However, the turntable 4 and the second disk D2 are located above the hinge 1a so that during the downward movement the second disk slides slightly toward the ejection direction A1 of FIG. 1.

Thus, after the second disk D2 has been brought back to the second disk receiving portion, it is not aligned with its original placement as represented with the solid line and dashed line of FIG. 3. An edge "K" of the second disk (at the ejection direction A1) is caught by an edge "Z" of the second disk receiving portion 12 of the disk tray 10. At this time, the second disk D2 is not completely received on the second disk receiving portion 12. Thus, the second disk D2 deviates from the second disk receiving portion 12 when the disk tray 10 is ejected, to thereby cause noise or damage to the second disk D2.

With respect to the first disk, the first disk receiving portion 11 has a slope 11b formed along an edge (see FIG. 2). Thus, even though the first disk lifted by the turntable 4 descends along the circular orbit in the same manner as the second disk, it is caught by the slope 11b, so that the first disk is guided along the slope 11b to be completely received on the first disk receiving portion 11.

However, a similar structure is not easily provided for the second disk receiving portion 12. Specifically, it is difficult to increase the slope of the second disk receiving portion 12 due to design restrictions; if the second disk receiving portion 12 has a slope along its outer edge, the second disk D2 easily deviates from the second disk receiving portion 12 along the slope due to inertia caused by the insertion or ejection of the disk tray 10.

SUMMARY OF THE INVENTION

To solve the above problem, it is an object of the present invention to provide a disk tray for a disk player in which disk receiving portions for receiving a disk are improved to completely return a disk, which has been lifted by a turntable, onto the disk receiving portions.

Accordingly, to achieve the above object of the present invention, a disk tray is provided for insertion and ejection from a disk player including a first disk receiving portion for receiving a first disk and a second disk receiving portion formed on the bottom of the first disk receiving portion for receiving a second disk having a diameter smaller than that of the first disk, wherein a center of the second disk receiving portion is eccentric from a center of the first disk receiving portion by a predetermined distance.

The eccentric distance is formed along an ejection direction of the disk tray.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 1:
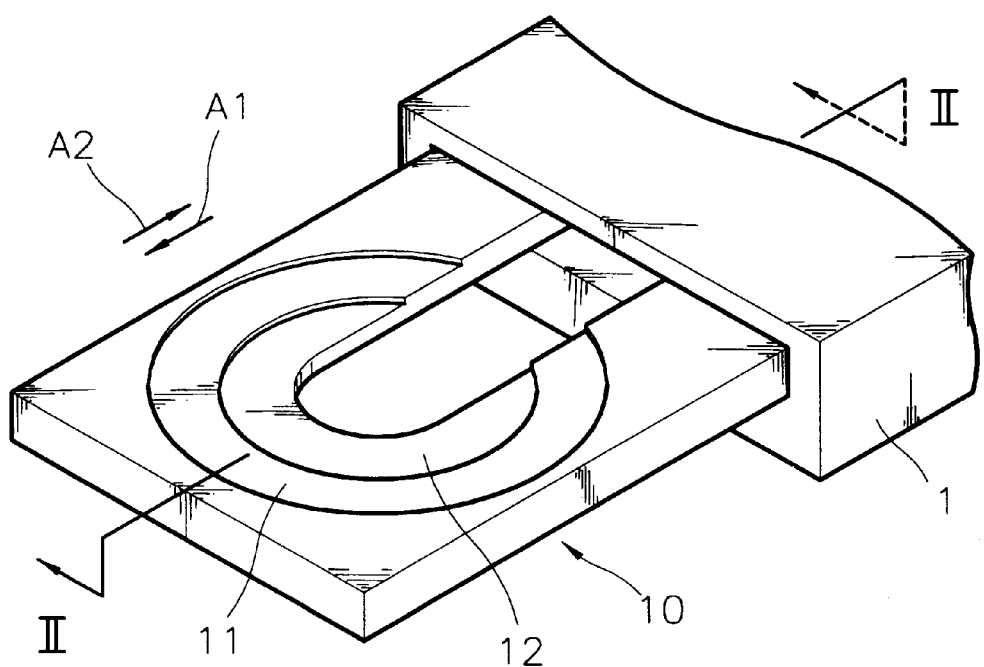
FIG. 1 is a schematic perspective view of a disk player including a conventional disk tray.
Figure 2:
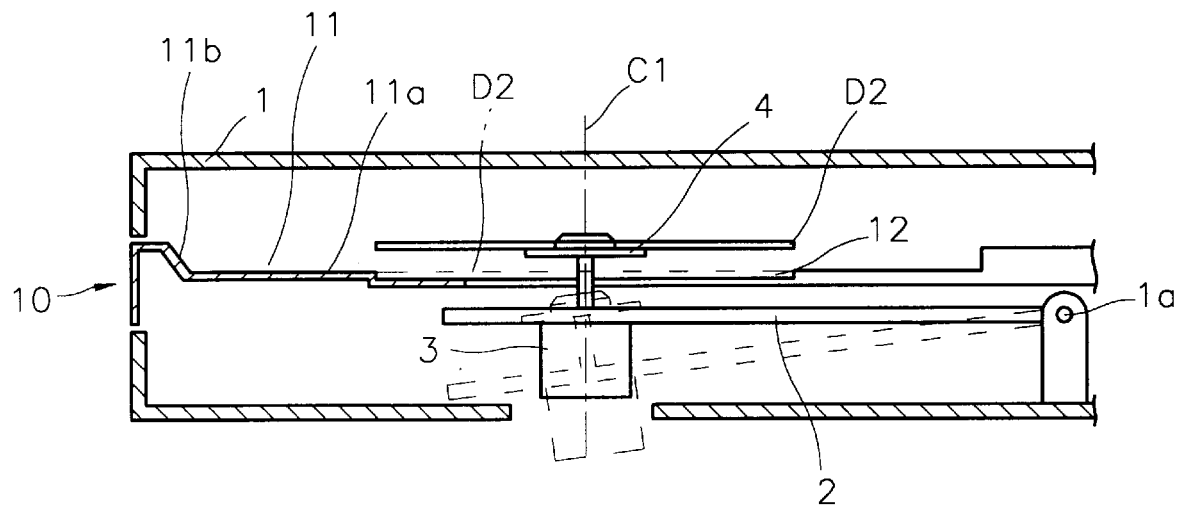
FIG. 2 is a schematic sectional view of the disk player of FIG. 1 with the disk tray inserted into a body thereof along line II—II.
Figure 3:
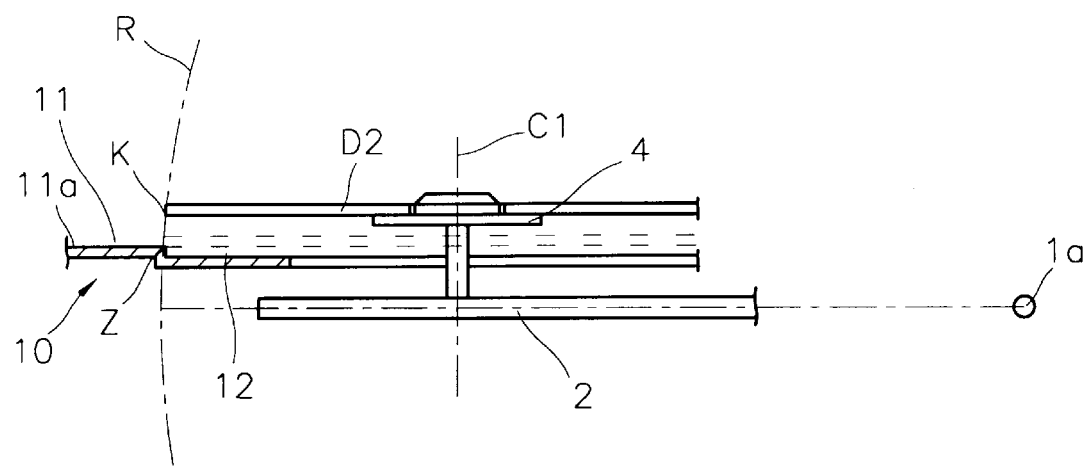
FIG. 3 is an enlarged view of a main portion of the disk player of FIG. 2.

FIGS. 4 through 7 show a disk player including a disk tray according to the present invention, where reference numerals identical to those of FIGS. 1 through 3 designate like reference elements.

Figure 4:
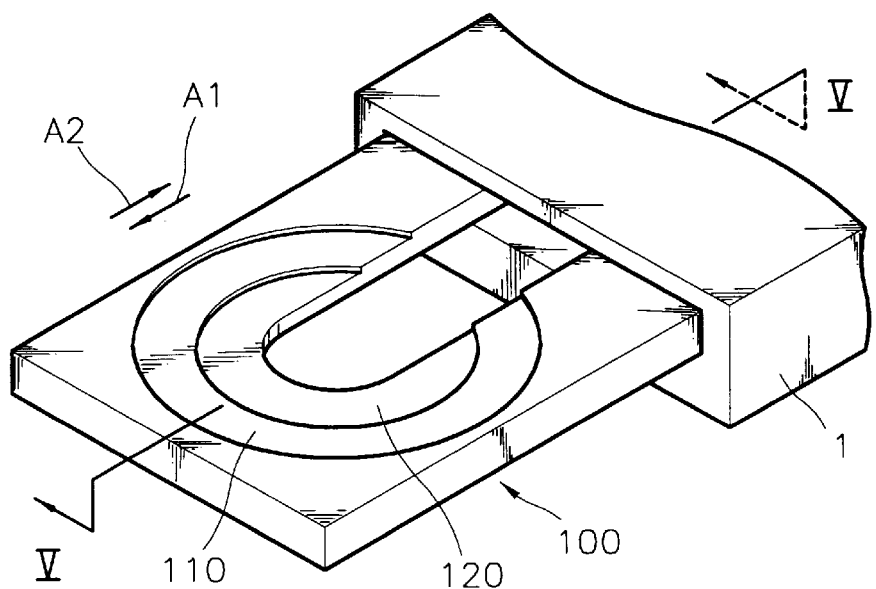
FIG. 4 is a schematic perspective view of a disk player including a disk tray according to the present invention.
Figure 5:
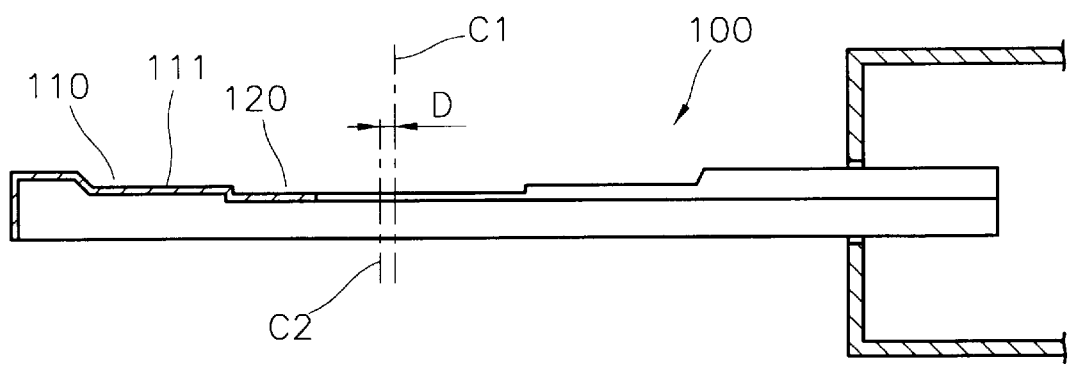
FIG. 5 is schematic sectional view of the disk player of FIG. 4 taken along line V—V.

A disk tray 100 for the disk player 1 in an embodiment shown in FIGS. 4 and 5 is installed to be moveable along an ejection or insertion direction A1 or A2 relative to a disk player body 1 so that a disk is loaded into the disk player body 1. The disk tray 100 includes a first disk receiving portion 110 for receiving a predetermined first disk, i.e., a disk having a 12 cm diameter, and a second disk receiving portion 120 for receiving a disk having a diameter smaller than that of the first disk, i.e., a disk having an 8 cm diameter. The first disk receiving portion 110 is formed on the upper surface of the disk tray and the second disk receiving portion 120 is formed on the bottom 111 of the first disk receiving portion 110.

In the disk tray 100 of the embodiment, the second disk receiving portion 120 is eccentric from the first disk receiving portion 110 by a predetermined distance "D". A center C2 of the second disk receiving portion 120 is spaced away from the center C1 of the first disk receiving portion 110 in the ejection direction A1 by the predetermined distance "D".

In the above disk tray 100, the first disk or the second disk is selectively loaded into the disk player body 1 in the same manner as the conventional disk tray 10. A structure of the second disk receiving portion 120 will now be described in detail.

Figure 6:
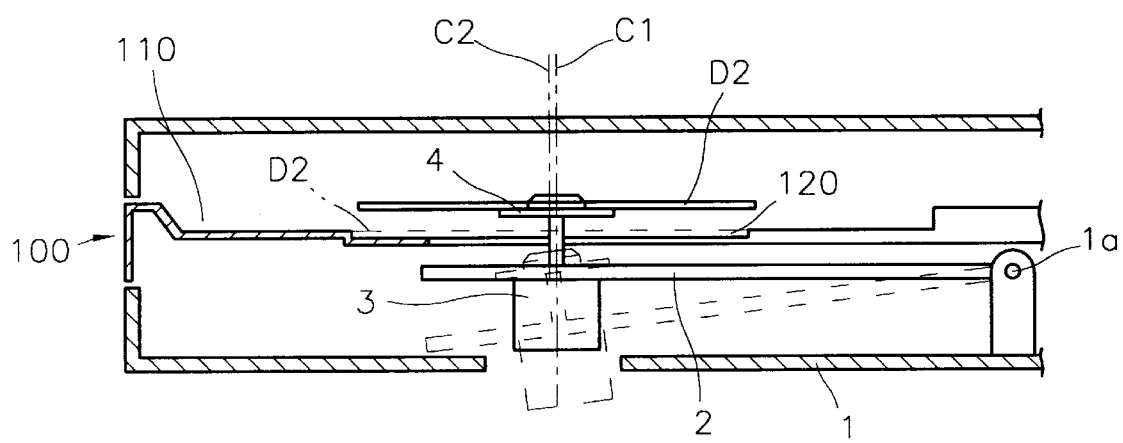
FIG. 6 is a schematic sectional view of the disk player when a disk tray is inserted.

Referring to FIG. 6, a turntable 4 rises to a position represented by a solid line by pivoting a deck 2 centering on a hinge 1a to lift a second disk. D2. As the turntable 4 ascends, the second disk D2 represented by a dashed line is lifted up from a position on the second disk receiving portion 120 to a position represented by the solid line on the turntable 4.

At this time, a center C1 of the first disk receiving portion 110 coincides with a center of the turntable 4. Also, a center C2 of the second disk receiving portion 120 is spaced away from the center C1 of the first disk receiving portion 110 in the ejection direction A1 by the predetermined distance "D", and thus the center C2 is spaced away from the center of the turntable 4 in the ejection direction A1 by the same distance "D". In other words, the second disk receiving portion 120 is eccentric to the turntable 4 in the ejection direction A1.

Figure 7:
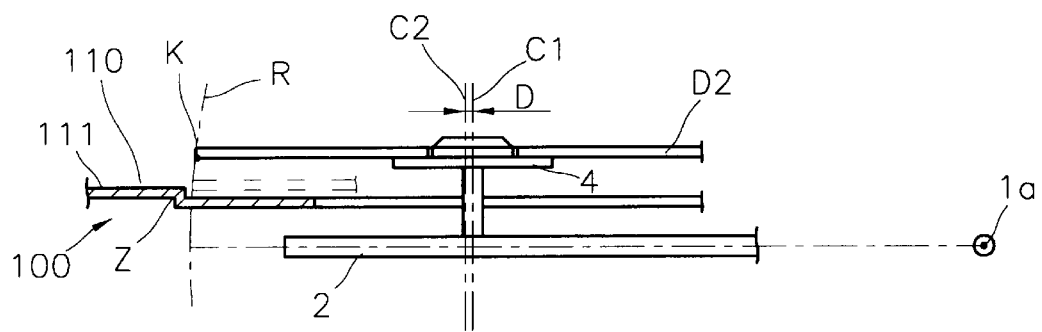
FIG. 7 is an enlarged view of a main portion of the disk player of FIG. 6.

When the disk tray 100 is to be ejected from the disk player body 1, in order to unload the second disk D2, the deck 2 pivots downward around the hinge 1a to lower the turntable 4 so that the second disk D2 is placed on the second disk receiving portion 120. As shown in FIG. 7, the second disk D2 supported by the turntable 4 is located above the hinge 1a, so that the second disk D2 moves downward along a circular orbit "R" centering the hinge 1a. Accordingly, the second disk D2 moves to the ejection direction A1 by a predetermined distance to be received on the second disk receiving portion 120.

The second disk receiving portion 120 is eccentric to the turntable 4 in the ejection direction A1 by the predetermined distance D, so that when the second disk D2 in the position represented with a solid line of FIG. 7 moves to a position represented with a dashed line, an edge "K" of the second disk D2 does not get caught by an edge "Z" of the second disk receiving portion 120 of the disk tray 100. Accordingly, the second disk D2 may be completely received on the second disk receiving portion 120. Thus, the second disk D2 does not deviate from the second disk receiving portion 120 as in conventional disk trays.

The distance "D" between the center C1 of the first disk receiving portion 110 and the center C2 of the second disk receiving portion 120 is predetermined with reference to a distance between the turntable 4 and the hinge 1a and a height of the turntable with respect to the deck 2. In other words, the distance "D" is designed so that the second disk D2 is completely received on the second disk receiving portion 120 during the descending of the second disk D2. For example, when the disk tray according to the present invention is used for a digital video disk (DVD) player, a CD-ROM drive of a computer or an audio disk player, the distance "D" is approximately 0.5–3 mm, and preferably, 1–1.5 mm.

As described above, according to the disk tray for a disk player of the present invention, the center of the second disk receiving portion for receiving a second disk is spaced away from the center of the first disk receiving portion for receiving a first disk having a diameter larger than that of the second disk in the ejection direction by a predetermined distance. Accordingly, when the second disk is returned to the second disk receiving portion of the disk tray, the second disk is not positioned along the edge of the second disk receiving portion, thus allowing the disk to be received on the disk receiving portion properly.

What is claimed is:

1. A disk tray for a disk player, for inserting into or ejecting from a disk player body, said disk tray comprising:

a first disk receiving portion for receiving a first disk; and a second disk receiving portion located within said first disk receiving portion so as to be formed on the bottom of said first disk receiving portion for receiving a second disk having a diameter smaller than that of the first disk, wherein a center axis of said first disk receiving portion passes through said second disk receiving portion, wherein the center axis of said second disk receiving portion is eccentric from the center axis of said first disk receiving portion by a predetermined distance while the second disk is being loaded by a turntable onto said second disk receiving portion, so as to facilitate the loading of the second disk onto said second disk receiving portion, and wherein said first and second disk receiving portions are formed on a same body so that said first disk receiving portion is not movable relative to said second disk receiving portion.

2. The disk tray of claim 1, wherein said predetermined distance is formed along an ejection direction of the disk tray.

3. The disk tray of claim 1, wherein said predetermined distance is 0.5–3 mm.

* * * * *